(12) United States Patent
Tondra et al.

(10) Patent No.: US 7,269,877 B2
(45) Date of Patent: Sep. 18, 2007

(54) FLOOR CARE APPLIANCE WITH NETWORK CONNECTIVITY

(75) Inventors: Aaron P. Tondra, North Canton, OH (US); Evan A. Gordon, Canton, OH (US)

(73) Assignee: The Hoover Company, North Canton, OH (US)

( * ) Notice: Subject to any disclaimer, the term of this patent is extended or adjusted under 35 U.S.C. 154(b) by 464 days.

(21) Appl. No.: 10/728,662

(22) Filed: Dec. 4, 2003

(65) Prior Publication Data

US 2005/0120504 A1    Jun. 9, 2005

(51) Int. Cl.
*A47L 9/28* (2006.01)
(52) U.S. Cl. .......................................... 15/319; 15/339
(58) Field of Classification Search .................. 15/319, 15/339
See application file for complete search history.

(56) References Cited

U.S. PATENT DOCUMENTS

| | | | | |
|---|---|---|---|---|
| 5,987,696 | A | 11/1999 | Wang | 15/319 |
| 5,995,884 | A * | 11/1999 | Allen et al. | 701/24 |
| 6,176,940 | B1 | 1/2001 | Wang | 134/21 |
| 6,446,302 | B1 | 9/2002 | Kasper | 15/319 |
| 7,199,711 | B2 * | 4/2007 | Field | 15/319 |
| 2002/0152576 | A1 * | 10/2002 | Murray et al. | 15/319 |
| 2003/0120972 | A1 * | 6/2003 | Matsushima et al. | 714/25 |
| 2004/0220707 | A1 * | 11/2004 | Pallister | 701/24 |
| 2005/0071056 | A1 * | 3/2005 | Tondra et al. | 701/23 |
| 2007/0124890 | A1 * | 6/2007 | Erko et al. | 15/319 |

FOREIGN PATENT DOCUMENTS

| | | |
|---|---|---|
| EP | 0651964 | 11/1994 |
| WO | WO 03/038581 | 10/2002 |

OTHER PUBLICATIONS

"Clever Motor Leads to Talking Vacuum Cleaners" Oct. 5, 2003 newscientist.com.
"Clever Motor Leads to Talking Vacuum Cleaners" Oct. 7, 2003 spacedaily.com.
"Electrolux to Provide Antartic Customer Support; World's Leading Manufacturer of Household Appliances Ensures Researchers at Antartic Bases will Not Go Without Clean Socks" PR Newswire Association Apr. 2, 2003.

* cited by examiner

*Primary Examiner*—Theresa T. Snider
(74) *Attorney, Agent, or Firm*—A. Burgess Lowe; Michael J. Corrigan

(57) ABSTRACT

A floor care appliance is provided with a microprocessor based control arrangement having a communications port for connection to a computer. Once connected to a computer, software updates for the microprocessor may be downloaded or diagnostic information stored in the microprocessor's memory may be uploaded for diagnostic purposes. In one embodiment of the invention, the communication port is configured to be connected to a local computer for possible further connection to a remote computer over a computer or telephone network. In an alternate embodiment of the invention, the communication port is configured to connect to and dial up a remote computer over a telephone network.

22 Claims, 5 Drawing Sheets

FLOOR CARE APPLIANCE WITH NETWORK CONNECTIVITY

BACKGROUND OF THE INVENTION

1. Field of the Invention

This invention relates to floor care, and more specifically, to a floor care appliance having a port for connecting the microprocessor control system to a computer.

2. Summary of the Prior Art

Floor care appliances are well known in the art. Typical floor care appliances include upright vacuum cleaners, canister vacuum cleaners, hard floor cleaners, and extractors. More recently floor care appliances have been provided with increasingly sophisticated microprocessor based control systems for controlling one or more features including, for example, a suction motor, agitator motor, bag full indicators, and the like. Typically, such microprocessors are permanently pre-programmed at the factory with instructions for controlling the features. The microprocessors are not connected to any electronic hardware which would enable programming to be updated if required. It would be desirable to have the flexibility of updating the programming of the microprocessor as more sophisticated programming becomes available. Also, with the addition of hardware to connect the microprocessor to a computer, the microprocessor becomes more useful. For example, the microprocessor could be programmed to store real time operational data in a log that could be read by a computer for diagnostics purposes. The computer could be a local personal computer or a remote computer.

U.S. Pat. No. 6,637,546 discloses a carpet cleaning machine provided with a microprocessor which controls various components. The microprocessor is software controlled and can provide sequential operating instructions to the operator, enforce start-up and shut down sequences, store an electronic record of operating parameters for future use, provide auto- and remote diagnostics, and provide remote control. The software is updated via a modem.

However, updating the microprocessor software via a modem is not the only way to update microprocessor software and may not be the most desired means. With the adaptation of readily available access to high speed computer network services, such as the Internet, and most homes having a personal computer connected to the Internet, it may be more desirable to update microprocessor software from a personal computer connected to a remote computer through a computer network such as the Internet. Accordingly, there is a need in the art for a floor care appliance having a microprocessor based control system that can be connected to a personal computer.

Accordingly, it is an object of the invention to provide a floor care appliance having a microprocessor based control system that can be connected to a computer.

It is a further object of this invention to provide a floor care appliance having a microprocessor based control system that can be connected to a personal computer.

It is a further object of this invention to provide a floor care appliance having a microprocessor based control system that can be connected to a personal computer via a digital pathway.

It is a further object of this invention to provide a floor care appliance having a microprocessor based control system that can be connected to a personal computer via a wireless connection.

It is a further object of this invention to provide a vacuum cleaner having a microprocessor based control system that can be connected to a remote computer via a modem.

SUMMARY OF THE INVENTION

In the preferred embodiment of the invention, a floor care appliance having a programmable microprocessor is provided wherein the microprocessor is programmed to store operational parameters of the appliance as well as real time performance data. The microprocessor is capable of being connected to a computer wherein the programmed operational parameters may be changed and the real time performance data uploaded to the computer. The performance data can then be evaluated to determine the operating condition of the cleaner for repair and maintenance purposes. The performance data may also be used to determine adjustments to be made to the operating parameters of the appliance which are downloaded to the microprocessor from the computer.

In one embodiment of the invention, the computer is a personal computer and the floor care appliance is connected via a digital pathway. The digital pathway could use any one of a number of computer protocols including RS-232, ethernet, Firewire, Blue Tooth, X10, infrared or the newer RS-485. The personal computer can then be used to update the microprocessor software provided on a removable storage media or retrieve it from a remote computer via the Internet or a dial-up connection through a modem.

In an alternate embodiment of the invention, the digital pathway between the floor care appliance and the personal computer is replaced with a wireless connection utilizing a radio frequency.

In another embodiment of the invention, the microprocessor is configured to be a modem so that the floor care appliance can be connected directly to a telephone network for dialing up and connecting to a remote computer for software updates and diagnostics. The microprocessor could be pre-programmed with a toll free or other number of a customer service center of the appliance's manufacturer.

In the instant invention, the subject microprocessor is part of an improved power management system for controlling the total amount of current provided to at least a first and a second load device of an appliance. The power management system is comprised of a microprocessor, an alternating current voltage source, a voltage regulating circuit, a clamping circuit, at least two load devices, and a MOC and a triac for each of the at least two load devices. The clamping circuit outputs a fixed voltage during the portion of the ac cycle which is greater than or less than zero and provides a zero or negligible voltage while the ac cycle is at zero voltage. The fixed voltage and the zero or negligible voltage are input to a microprocessor. The microprocessor utilizes these inputs to control the amount of time the current is turned on to each of the at least first and second load devices. The current is turned on to each of the at least first and second load devices by an output from the microprocessor provided to the associated MOC which in turn controls the associated triac for turning the current on to the associated load. One of the at least first and second loads has a sensing circuit which monitors the current drawn by the load. A surge or rise in the current drawn will cause an output from the sensing circuit which is input to the microprocessor. The microprocessor will adjust according to pre-programmed instructions the amount of time the current is turned on to each of the at least first and second loads so that the total current drawn by all of the at least first and second loads does not exceed a predetermined value. This requires that the microprocessor reduce the current provided to the at least second load to account for the increased amount of current used by the first load.

In one embodiment of the power management system, the at least first and second loads are a motor-fan assembly and an agitator drive motor. The pre-determined level or total current that may be drawn by both motors is 12 amps with the agitator drive motor initially programmed to draw 2 amps. This means that the motor-fan assembly can initially draw 10 amps. An increase in the load placed on the agitator drive motor will cause the amount of current drawn by the agitator drive motor to exceed 2 amps. Necessarily, the microprocessor will adjust the current provided to the motor-fan assembly to less than ten amps.

BRIEF DESCRIPTION OF THE DRAWINGS

Reference may now be had to the accompanying drawings for a better understanding of the invention, both as to its organization and function, with the illustration being only exemplary and in which.

DETAILED DESCRIPTION OF THE INVENTION

Figure 1:
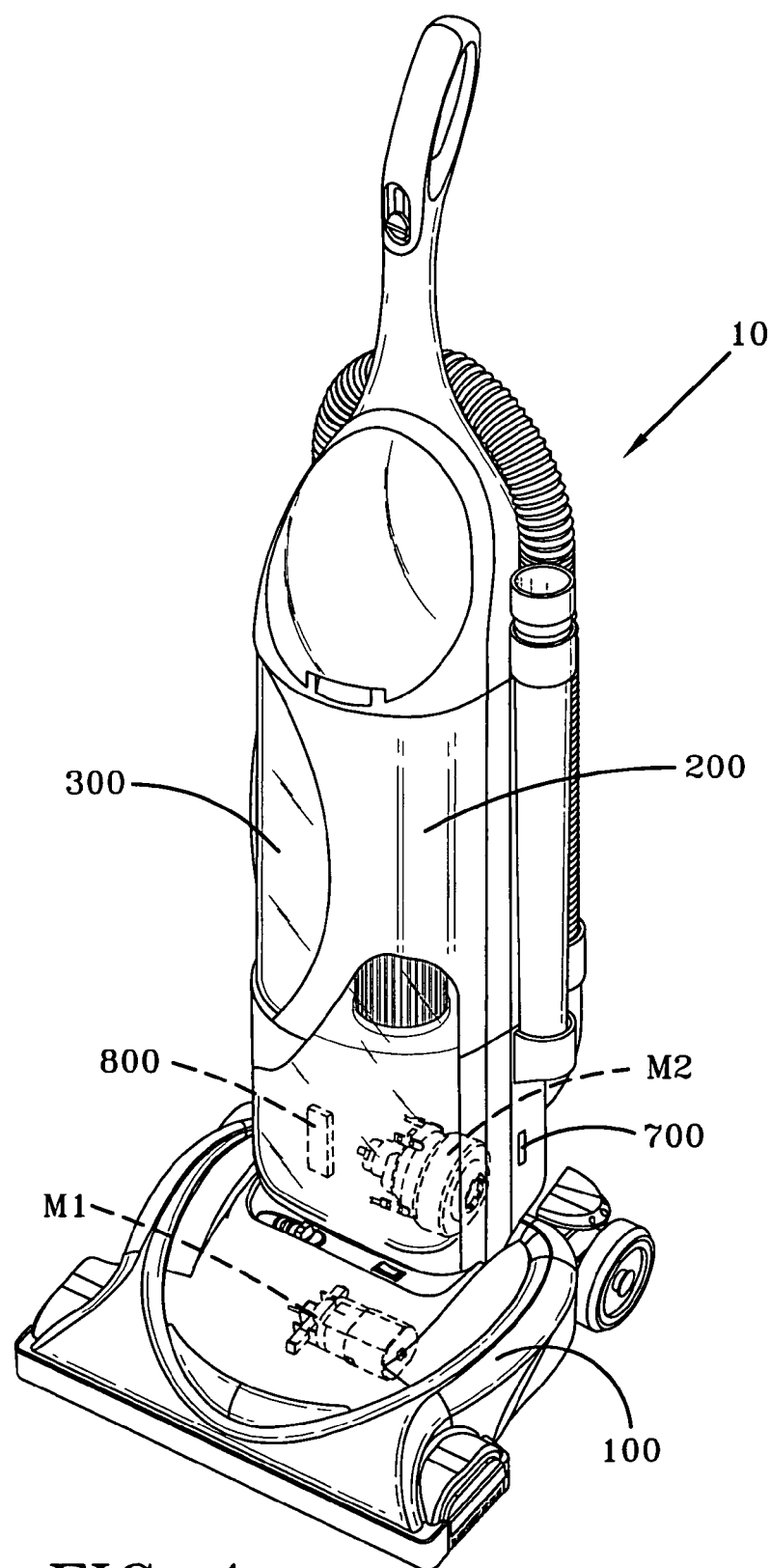
FIG. 1 is a perspective view of a floor care appliance having a port for connection to a computer, according to the preferred embodiment of the present invention.
Figure 2:
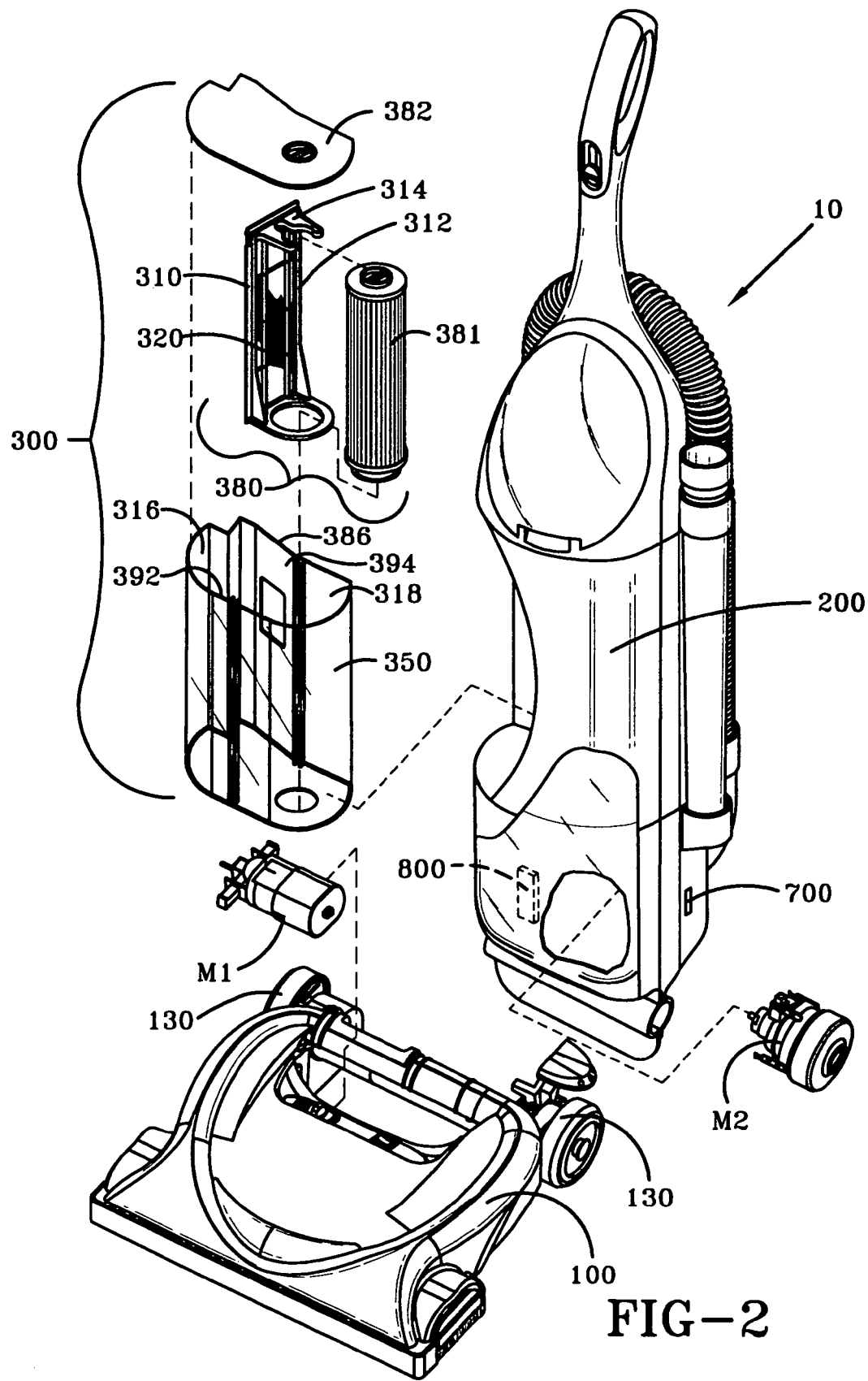
FIG. 2 is an exploded view of a floor care appliance having a microprocessor controlled power management system having a port for connection to a personal computer, according to the preferred embodiment of the present invention.

Referring now to FIGS. 1 and 2, shown is an upright vacuum cleaner 10 having a microprocessor based control system having a port 700 for connection to a computer. Upright vacuum cleaner 10 includes a foot 100 and an upper housing assembly 200 pivotally connected to foot 100. Foot 100 is similar to those known in the art and includes a nozzle opening (not shown) for receiving a stream of dirt-laden air and an agitator (not shown) for agitating and loosening dust and debris from a floor surface when upright vacuum cleaner 10 is in the floorcare mode. Foot 100 further includes a pair of front wheels (not shown), rotatably mounted on a wheel carriage (not shown), and a pair of rear wheels 130.

Located in foot 100 or upper housing 200 is a motor-fan assembly M2 which creates the suction necessary to remove the loosened dust and debris from the floor surface. The motor-fan assembly M2 fluidly connects to foot or suction nozzle 100 by a dirt duct (not shown). The upper housing assembly 200 houses a particle filtration and collecting system 300 for receiving and filtering the dirt-laden airstream which is created by the motor-fan assembly 400. The particle filtration and collecting system 300 may be interposed in the dirt-laden airstream between the suction nozzle 100 and the motor-fan assembly M2 as in an "indirect air" system seen in FIG. 1, or the motor-fan assembly M2 may be interposed between the suction nozzle 100 and the particle filtration and collecting system 300 as in a "direct air" system. An independent electric agitator drive motor M1 is provided for providing rotary power for at least one rotary agitator (not shown). Motor-fan assembly M2 and agitator drive motor M1 are controlled by a power management system 800 located in the upper housing 200. Although power management system 800 may be located anywhere on the floor care appliance 10, including foot 100, it is desirable to have power management system 800 located in a moving airstream, such as the exhaust for motor-fan assembly M2, for cooling purposes. Power management system 800 is shown in FIG. 1 in the form of a snap-in module but may be constructed in numerous other ways. A detailed description of the composition and operation of power management system 800 is given below.

Referring now to FIG. 2, shown is an exploded view of a floor care appliance 10 with a preferred embodiment dirt collecting system 300. Dirt collecting system 300 generally includes a translucent dirt cup 350, a filter assembly 380 removably mounted within the dirt cup 350 and a dirt cup lid 382 which encloses the dirt cup 350. Filter assembly 380 generally includes an apertured wall 312, a filter support 314 extending from the apertured wall 312 and a primary filter member 381 which removably mounts on the filter support 314. The filter assembly 380, and particularly the apertured wall 312 thereof, along with the partition wall 310, separate the dirt cup chamber 394 into a first dirt collecting chamber 316 and a second dirt collecting chamber 318. The apertured wall 312 is positioned between rear wall 386 and front wall 392 and is formed with a plurality of apertures or holes 320. The holes 320 provide for fluid communication between the first dirt collecting chamber 316 and the second dirt collecting chamber 318. The apertured wall 312 functions as a coarse particle separator or pre-filter and could include any number of holes having various shapes (circular, square, elliptical, etc.), sizes and angles. To maximize airflow through the holes while still preventing large debris from passing therethrough, it is desirable to form the holes as large as 0.0036 square inches and as small as a 600 mesh screen. In the present embodiment, the holes 320 are circular with a hole diameter of approximately 0.030 inches. Further, the apertured wall 312 should be formed with enough total opening area to maintain airflow through the dirt cup 350. It is desirable to form apertured wall 312 with a total opening area of between approximately 2.5 square inches to approximately 4 square inches. Complete details of the dirt collecting system 300 can be found in U.S. Pat. No. 6,596,044, owned by a common assignee and incorporated fully herein by reference.

On the lower portion of upper housing 200 is a data port 700 for connecting floor care appliance 10 to a network. A microprocessor 810 located in floor care appliance 10 may be used to control various features of floor care appliance 10. The microprocessor 810 may be part of power management system 800 or otherwise. A microprocessor 810 used for this purpose usually is pre-programmed at the factory with the operational parameters of the floor care appliance 10. Upon connection of floor care appliance 10 to a computer, the operational parameters may be changed through the computer. The microprocessor 810 could also be programmed to collect and store real time performance data which may also be uploaded to the computer. The performance data can be evaluated to determine the operating condition of the floor care appliance 10 for repair and maintenance purposes. The performance data, which is downloaded to the microprocessor 810 by the computer, may also be used to determine adjustments that should be made to the operating parameters of the appliance 10 to improve performance. Examples of such performance data could include a log of the running time of motors, cleaner suction, agitator brush life, and airflow in the various parts of the appliance 10.

Figure 3:
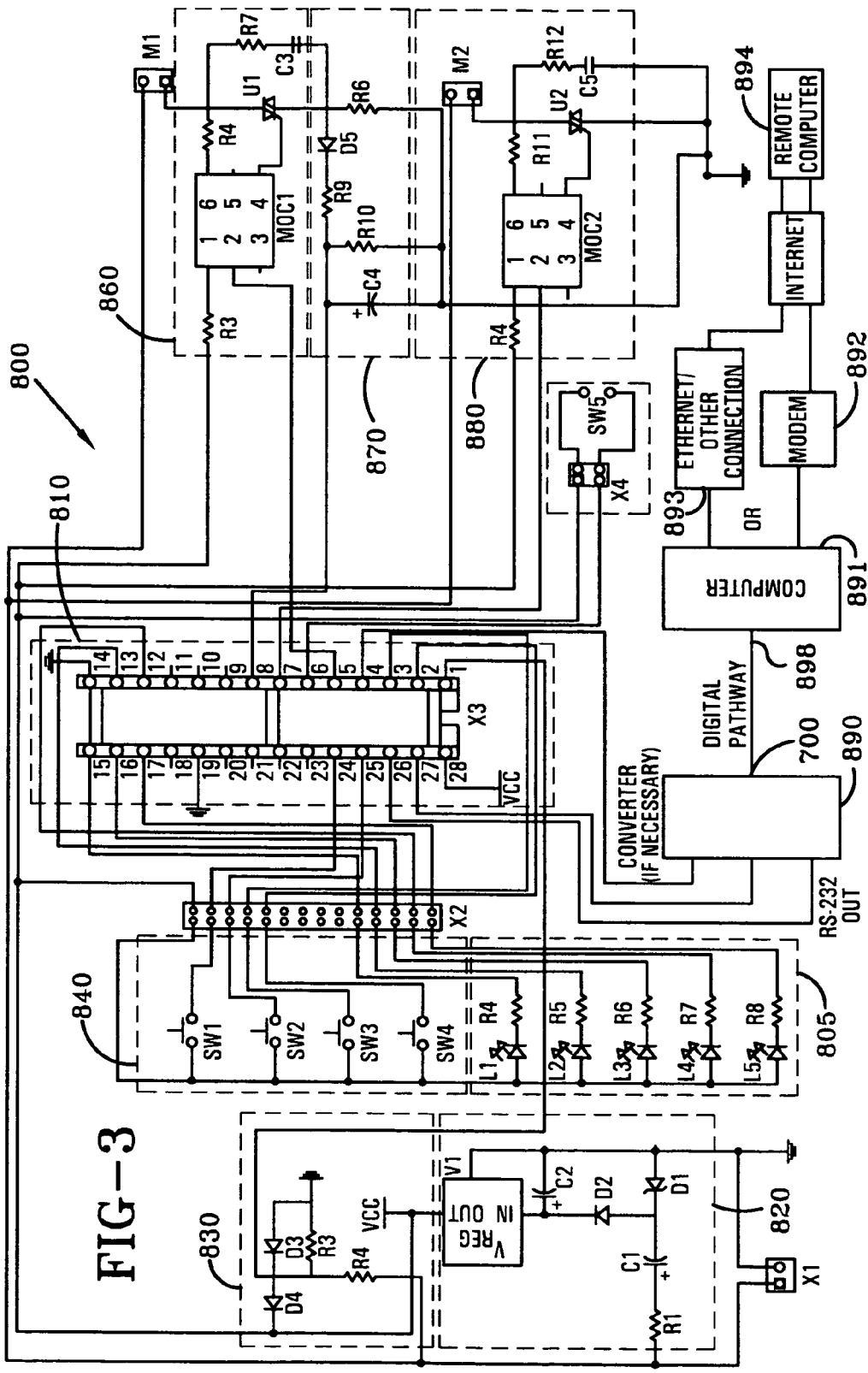
FIG. 3 is an electrical schematic of a microprocessor controlled power management system having a port for connection to a computer, according to the preferred embodiment of the present invention.

Referring now to FIG. 3, shown is an electrical schematic of the preferred embodiment of the power management system 800 having the capability of being connected to a computer 891. Power management system 800 is comprised of a microprocessor 810, an alternating current voltage source X1, a voltage regulating circuit 820, a clamping or "zero cross detecting circuit" 830, at least two load devices M1 and M2, at least a first load driver circuit 860 and a second load driver circuit 880, a sensing circuit 870 for sensing the current drawn by one of the at least two load devices M1 and M2, a plurality of switches $SW_1$ to $SW_n$ (840) for controlling various floor care appliance 10 features, and a plurality of light emitting diodes $L_1$ to $L_n$ (805) whereon one light emitting diode $L_x$ is associated with one of said plurality of switches $SW_1$ to $SW_n$ (805). The clamping or zero cross circuit 830 outputs a fixed voltage during the portion of the ac cycle which is greater than or less than zero and outputs a zero or negligible voltage while the ac cycle is crossing the zero voltage threshold. Thus, clamping circuit 830 acts as a "zero cross detector" at any given time as either the fixed voltage or the zero or negligible voltage is input to a microprocessor 810 so the microprocessor 810 knows when the ac cycle is crossing the zero voltage threshold. In the preferred embodiment of the invention, the fixed voltage is 5.7 volts, and the zero or negligible voltage is –0.7 volts.

The microprocessor 810 is programmed to utilize these inputs to control the amount of time the current is turned on to each of the at least first and second load devices M1 and M2. The microprocessor 810 essentially has timers for each of the at least two load devices M1 and M2 that start timing the amount of time the current is turned on to each of the at least two load devices M1 and M2 each time the ac current crosses past the zero voltage threshold. The current is turned on to each of the at least first and second load devices M1 and M2 by an output from the microprocessor 810 provided to an associated triac driver device MOC1 and MOC2 known as a "MOC" which in turn controls an associated triac U1 and U2 which when activated turns the current on to an associated load device M1 and M2. A triac drive device or "MOC" model no. MOC3010-M made by Fairchild Semiconductor of South Portland, Me. has been found to be suitable for this purpose.

One of the at least first and second loads M1 and M2 has a sensing circuit 870 associated with it which monitors the current drawn by the load device M1 and M2. In the preferred embodiment, the current sensing circuit 870 is associated with M1. A surge or rise in the current drawn by the load device M1 will cause an output from the sensing circuit 870 which is input to the microprocessor 810. The microprocessor 810 will adjust according to pre-programmed instructions the amount of time the current is turned on to each of the at least first and second loads M1 and M2 so that the total current drawn by all of the at least first and second loads M1 and M2 does not exceed a predetermined value. This requires that the microprocessor 810 reduce the current provided to the at least second load device M2 to account for the increased amount of current used by the first load device M1. When the increased load on the second load device M2 is reduced, the programming of microprocessor 810 programming will reduce the amount of time that current is turned on to the first load M1 while increasing the amount of time the current is turned on to the second load M2 such that the total current used by both the first and second load M1 and M2 does not exceed the predetermined value.

In one embodiment of the power management system 800, the at least first and second loads M1 and M2, respectively, comprise an agitator drive motor and a motor-fan assembly. The predetermined level or total current that may be drawn by both motors is 12 amps with the agitator drive motor M1 initially programmed to draw 2 amps. This means that the motor-fan assembly M2 can initially draw 10 amps. An increase in the load placed on the agitator drive motor M1 will cause the amount of current drawn by the agitator drive motor M1 to exceed 2 amps. Necessarily, the microprocessor 810 will adjust the current provided to the motor-fan assembly M2 to less than 10 amps. Note that this is only one possible configuration, as additional loads M3 through Mn may be added, and the microprocessor 810 can be programmed to adjust the current to each of the loads M1 through Mn as the current increases in one of the M1 through Mn loads so that the sum total current used by all loads M1 through Mn does not exceed a predetermined value. With the use of switches $SW_1$ to $SW_n$ (840) to turn various features on and off, the microprocessor 810 can control the current to each of the loads M1 through Mn that remain on so that the total current drawn by the loads M1 through Mn does not exceed a predetermined level. The entire power management system 800 could be embedded on a plug in module which simplifies assembly of floor care appliance 10 and replacement and/or upgrade of power management system 800.

Power is supplied to power management system 800 by an ac voltage source X1 which is typically 120 vac at 60 hz. The 120 vac line voltage is reduced through a resistor R1 and capacitor C1 and then the Zener diode D1 which clamps the voltage to around 30 vac. The 30 vac voltage is half-wave rectified to direct current through the diode D2 and smoothed through a capacitor C2. The smoothed direct current is fed into a voltage regulator V1 that outputs a regulated 5 vdc voltage from the 10-35 vdc input. This 5 vdc power is then supplied to the microprocessor and the other low voltage devices and controls discussed above.

The 120 vac voltage source X1 also has its voltage dropped through the resistive divider R3 and R4. On the positive half of the AC wave, the upper diode D4 conducts and the output signal is clamped to 5.7 vdc. On the negative half of the AC wave, the lower diode D3 conducts and the output signal is clamped to 0 vdc. The square wave pulse train coincides with the zero crossing of the main 120 vac line. The signal is fed into the microprocessor 810 and used to sequence the firing of motors M1 and M2 (or other load devices M3 through Mn) with the main ac voltage line based upon the zero crossing.

The switches $SW_1$ through $SW_n$ (840) look for a transition from 0 vdc to 5 vdc or vice versa to recognize a valid press. Each switch $SW_1$ to $SW_n$ (840) corresponds with a different mode, feature or speed selection. The LEDs $L_1$ through $L_n$ (805) and associated resistors R4 through Rn are used for indication of which mode, feature or speed is currently selected.

Each of the load driver circuits 860 and 880 is comprised of a MOC 1 and MOC 2, respectively, used for firing triacs U1 and U2, respectively. MOC 1 and MOC 2 are devices that are used to either block or pass a portion of the 120 vac power to load devices M1 and M2. When a valid zero cross is determined, timers internal to microprocessor 810 start timing. When the preset time is reached, the input signal to MOC 1 and MOC 2 is toggled, and the device will allow a portion of the 120 vac wave to pass. The preset times can range from 0 to 7 miliseconds, depending on the average voltage that needs to be passed to M1 and M2. Triacs U1 and U2 are devices that switch on and off, allowing current to flow to M1 and M2 based upon MOC 1 and MOC 2 and the timing signal coming through the microprocessor 810.

Current sensing circuit 870 is a low ohm power resistor that generates a voltage with respect to the current through the agitator motor M1. That low voltage AC signal is half-wave rectified through a diode, filtered and smoothed through a resistive/capacitive network. That signal is then fed into an A/D pin on the microprocessor 810 where it is used to determine the load on M1. Based upon the load on M1, decisions can be made to change the speeds of M1 and M2 based upon the surface being cleaned, stall detection, etc.

In the preferred embodiment of the invention, a microprocessor 810 such as the one in power management system 800 or other microprocessor could be configured and programmed to collect and store data related to the operating parameters of the floor care appliance 10 such as was heretofore described related to the control of the current supplied to the at least first and second loads M1 and M2. However, there could be an infinite number of possibilities as to what may be programmed into the microprocessor 810 or other microprocessor as various known and heretofore unknown features are added to floor care appliance 10. The microprocessor 810 or other microprocessor could also be programmed to collect and store real time performance data related to the performance and operation of floor care appliance 10. The performance data can then be evaluated to determine the operating condition of the floor care appliance 10 for repair and maintenance purposes. The performance data may also be used to determine adjustments to be made to the operating parameters of the floor care appliance 10 which are downloaded to the microprocessor 810 or other microprocessor over a network connected to a remote interface. Other possibilities of information that can be programmed into microprocessor 810 include date of purchase, warranty, serial number, production run number and date, model no., parts lists, etc. The data port 700 connected to the microprocessor 810 or other microprocessor is provided on floor care appliance 10 for this purpose. Data port 700 may be one of several types of data ports such as USB, serial, parallel, RJ-11 or other known or unknown data ports described hereinbelow.

In the preferred embodiment of the connection arrangement, as seen in FIG. 3, a floor care appliance 10 (not shown) is connected via a digital pathway 898, such as a USB cable, to a personal type computer 891 which is further connected to a computer network, such as the Internet, through an ethernet connection 893 or a modem 892. The microprocessor 810 is connected to a RS-232 converter 890 which converts RS-232 serial signals to other protocols such as the heretofore described Universal Serial Bus (USB). The digital pathway 898 is connected to the RS-232 converter through the port 700. Alternate protocols that can be used over the digital pathway include RS-232, ethernet, Firewire, Blue Tooth, X10, infrared or the newer RS-485. The digital pathway 898 can also be replaced with a wireless connection that uses a radio frequency, including a wireless modem. These signals are input to the appropriate port on a personal computer 891. The personal computer user may upload or retrieve performance data over the digital pathway 898 from the microprocessor 810 and then upload the data to a remote site 894 via the Internet. The remote site 894 will typically be an appliance repair facility which will analyze the data for the appliance's performance and possible malfunctions. The repair facility may also transmit new operational parameters to be downloaded to microprocessor 810 of appliance 10 based upon the analysis of the performance data. Upgrades to the operational parameters of the appliance 10 may also be provided by the repair facility or posted on a web site for retrieval by the end user at the personal computer site 891. Upgrade or repair data could also be distributed on other computer storage media, such as a CD-ROM, for installation by the end user at the personal computer site 891.

Figure 4:
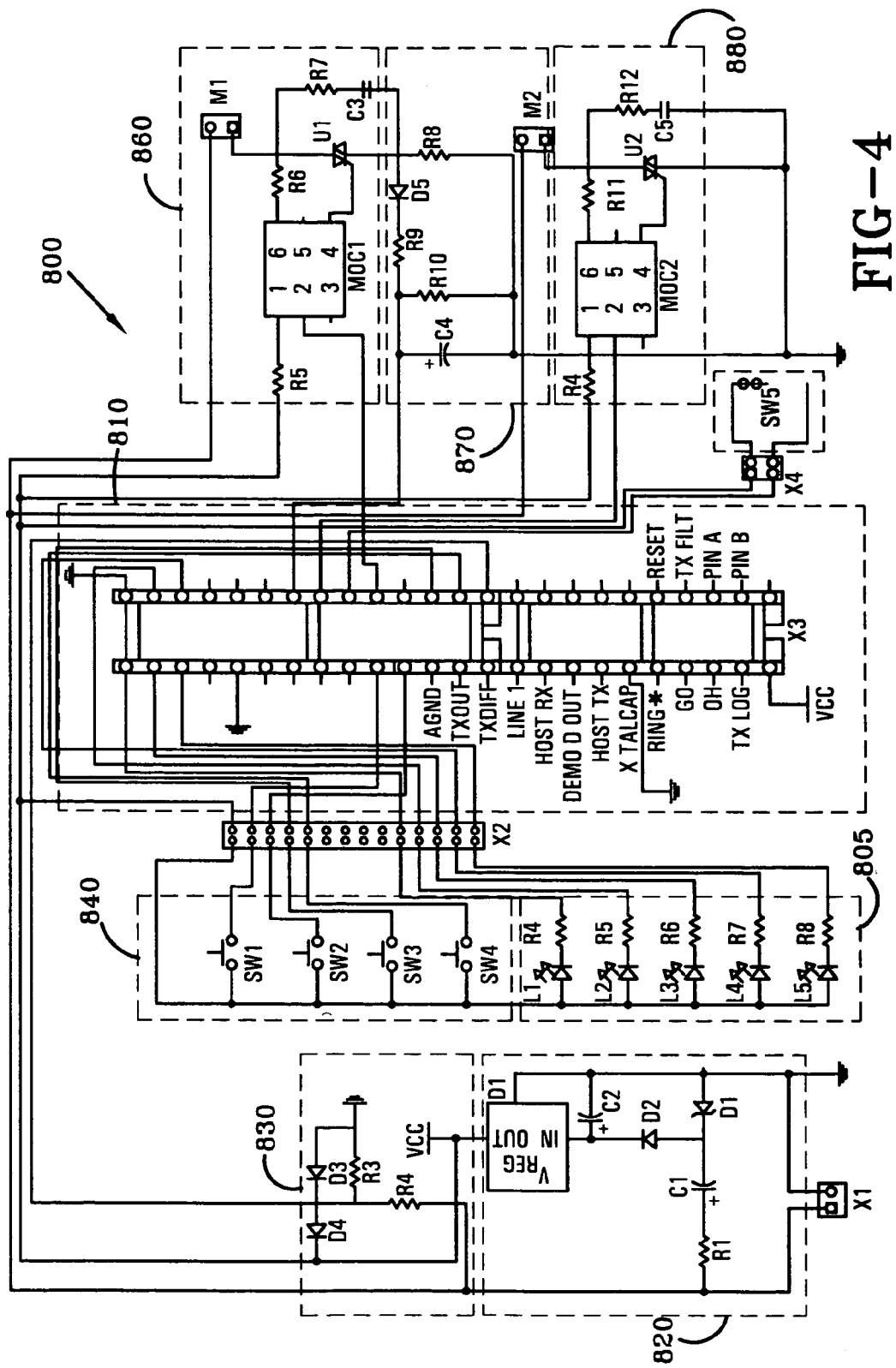
FIG. 4 is an electrical schematic of an improved power management system having a port for connection to a remote computer through a telephone network, according to an alternate embodiment of the present invention.
Figure 4A:
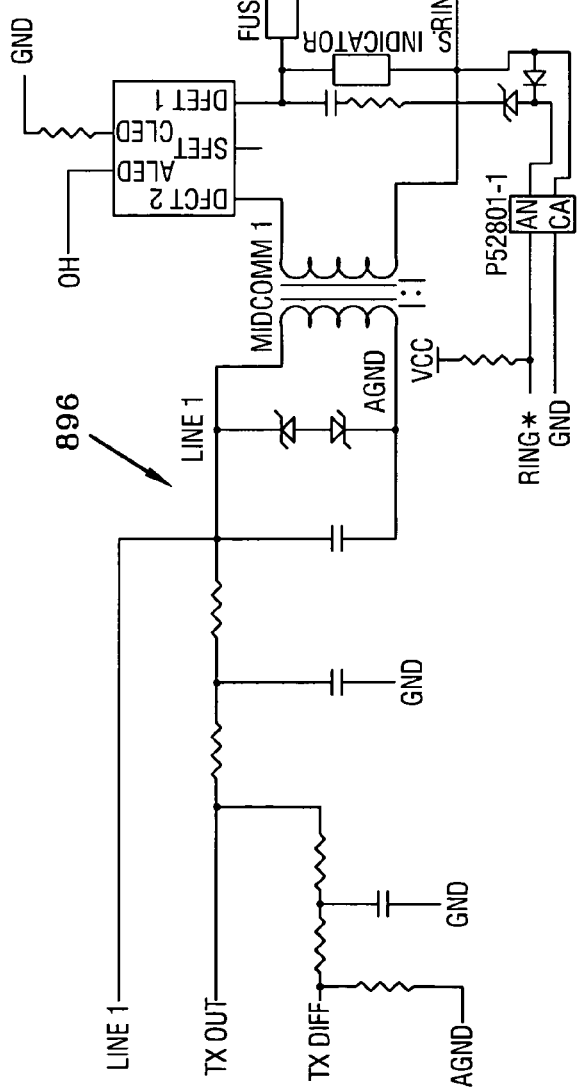
FIG. 4A is an electrical schematic of an RS-232 transceiver connected to the microprocessor shown in FIG. 4 for converting data from said microprocessor into RS-232 protocols for connecting the power management system to a remote computer through a telephone network, according to the alternate embodiment of the invention.
Figure 4B:
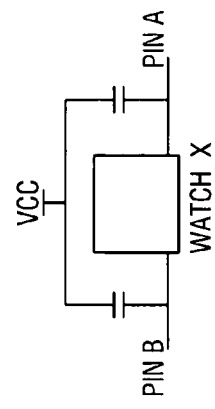
FIG. 4B is an electrical schematic of an isolation circuit for isolating the RS-232 transceiver from the telephone network, according to the alternate embodiment of the present invention.
Figure 4C:
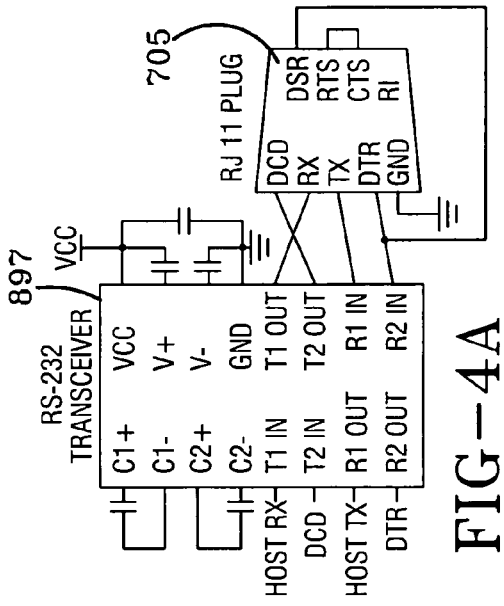
FIG. 4C is a switching circuit for signaling the microprocessor shown in FIG. 4 to connect the RS-232 transceiver shown in FIG. 4A with a remote computer through a telephone network, according to the alternate embodiment of the present invention.
Figure 4D:
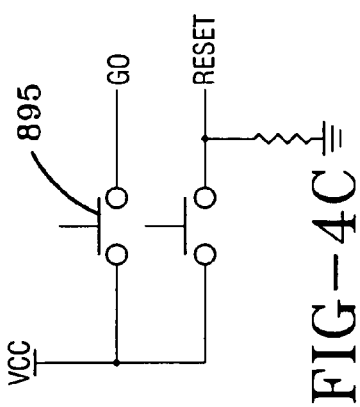
FIG. 4D is a circuit for connecting the microprocessor to ground, according to the alternate embodiment of the present invention.
Figure 4E:
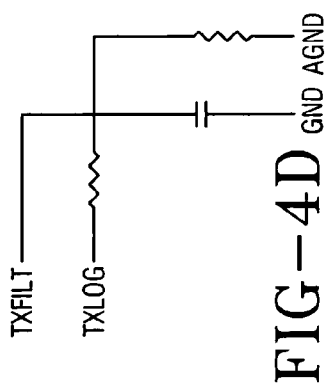
FIG. 4E is a circuit for timing data for the modem of FIG. 4C, according to the alternate embodiment of the present invention.

In an alternate embodiment of the connection arrangement, as seen in FIG. 4, a power management system X1 is provided with a microprocessor 810 that is configured with an internal modem so that microprocessor 810 and floor care appliance 10 can be connected directly to a telephone network for further connection to a remote computer. To function as a modem, microprocessor 810 must be connected to an RS-232 transceiver (FIG. 4A) before being connected to an RJ-11 jack serving as port 705. In addition, an isolation circuit 896 (FIG. 4B) is required to isolate the microprocessor 810 from the telephone line. The operation of the modem function can be commenced by the user through means such as a switch 895 (FIG. 4C). Once switch 895 is closed and port 705 is connected to a telephone network through a connection such as an RJ-11 jack connected to the RS-232 transceiver 897, microprocessor 810 will dial a pre-programmed number. Preferably, the pre-programmed number will be a toll free number to a customer service center. Once connected, the microprocessor 810 can exchange data with a remote computer 894 at a location such as a customer service center for the reasons heretofore discussed.

It should be clear from the foregoing that the described structure clearly meets the objects of the invention set out in the description's beginning. It should now also be obvious that many changes could be made to the disclosed structure which would still fall within its spirit and purview.

The invention claimed is:

1. A floor care appliance, comprising:
    a base portion for contacting a floor surface and performing a cleaning operation thereon;
    at least one electrically powered device producing work related to the cleaning operation;

a microprocessor maintaining at least one operational parameter used to control said at least one electrically powered device, said microprocessor configured to collect and store performance data associated with said electrically powered device; and a port electronically connected to said microprocessor for selectively connecting said floor care appliance to a personal computer through a digital pathway, said personal computer configured to modify said at least one operational parameter based on said collected performance data.

2. The floor care appliance of claim 1, wherein said digital pathway utilizes a protocol that is a member of the group consisting of RS-232, Universal Serial Bus, ethernet, Firewire, Blue Tooth, X10, infrared, and RS-485.

3. The floor care appliance of claim 1, wherein said personal computer is connected to a remote computer, said remote computer configured to update said microprocessor with new operational parameters based on said collected performance data.

4. The floor care appliance of claim 3, wherein said personal computer is connected to said remote computer via a member of the group consisting of a modem and computer network.

5. The floor care appliance of claim 3, wherein said microprocessor is pre-programmed with an address for connecting to said remote computer.

6. A floor care appliance, comprising:
a base portion for contacting a floor surface and performing a cleaning operation thereon;
at least one electrically powered device producing work related to the cleaning operation;
a microprocessor maintaining at least one operational parameter used to control said at least one electrically powered device, said microprocessor configured to collect performance data associated with said electrically powered device; and
a port electronically connected to said microprocessor for selectively connecting said floor care appliance to a personal computer through a wireless connection, said personal computer configured to modify said at least one operational parameter based on said stored performance data.

7. The floor care appliance of claim 1, wherein said performance data is collected in real-time.

8. The floor care appliance of claim 6, wherein said personal computer is connected to a remote computer, said remote computer configured to update said microprocessor with new operational parameters based on said stored performance data.

9. The floor care appliance of claim 8, wherein said personal computer is connected to said remote computer via a member of the group consisting of a modem and computer network.

10. The floor care appliance of claim 8, wherein said microprocessor is pre-programmed with an address for connecting to said remote computer.

11. A vacuum cleaner, comprising:
a base portion for contacting a floor surface and performing a cleaning operation thereon;
at least one electrically powered device producing work related to the cleaning operation;
a microprocessor maintaining at least one operational parameters used to control said at least one electrically powered device, said microprocessor configured to collect performance data associated with said electrically powered device; and
a modem connected to said microprocessor for selectively connecting said vacuum cleaner to a remote computer via a modem over a telephone network, said remote computer configured to update said microprocessor with new operational parameters based on said collected performance data.

12. The vacuum cleaner of claim 11, further comprising:
a switch for initiating the connection of said modem to said telephone network for connecting said vacuum cleaner to said remote computer.

13. The vacuum cleaner of claim 11, wherein said microprocessor is pre-programmed with a telephone number of a remote computer connected to said telephone network.

14. A method of connecting a floor care appliance having a base portion for contacting a floor surface and performing a cleaning operation thereon and at least one electrically powered device producing work related to the cleaning operation to a personal computer, comprised of the steps of:
providing a floor care appliance with a microprocessor for controlling said at least one electrically powered device in accordance with at least one operational parameter;
collecting and storing performance data based on the operation of said floor care appliance;
selectively connecting said microprocessor to a personal computer through a digital pathway; and
modifying said at least one operational parameter based on said performance data collected at said collecting step.

15. The method of connecting a floor care appliance to a personal computer of claim 14, further comprised of the steps of:
providing a switch on said floor care appliance; and
pushing said switch to initiate the connection of said microprocessor to said personal computer through said digital pathway.

16. A method of connecting a floor care appliance having a base portion for contacting a floor surface and performing a cleaning operation thereon and at least one electrically powered device producing work related to the cleaning operation to a remote computer, comprised of the steps of:
providing the floor care appliance with a microprocessor for controlling said at least one electrically powered device in accordance with at least one operational parameter;
collecting performance data based on the operation of said floor care appliance at said microprocessor;
connecting said microprocessor to a personal computer through a digital pathway;
exchanging data between said microprocessor and said personal computer;
connecting said personal computer to a remote computer;
analyzing said collected performance data at said remote computer; and
updating said microprocessor with new operational parameters based on said analyzing step.

17. The method of connecting a floor care appliance to a remote computer of claim 16, further comprised of the steps of:
providing a switch on said floor care appliance; and
pushing said switch to initiate the connection of said microprocessor to said personal computer through said digital pathway.

18. The method of connecting a floor care appliance to a remote computer of claim 16, wherein the step of connecting said personal computer to a remote computer includes establishing the connection with a member of the group consisting of a modem and a computer network.

19. The method of connecting a floor care appliance to a remote computer of claim 18, further comprised of the step of pre-programming said microprocessor with an address for connecting to said remote computer.

20. A method of connecting a vacuum cleaner having a base portion for contacting a floor surface and performing a cleaning operation thereon and at least one electrically powered device producing work related to the cleaning operation to a remote computer, comprised of the steps of:

providing a vacuum cleaner with a microprocessor, said microprocessor maintaining at least one operational parameter used to control said at least one electrically powered device;

collecting performance data based on the operation of said electrically powered device;

providing a modem connected to said microprocessor;

connecting said modem to a telephone network;

connecting said telephone network to a remote computer;

analyzing said performance data obtained at said collecting step;

updating said microprocessor with new operational parameters based on said analyzing step; and exchanging data between said microprocessor and said remote computer.

21. The method of connecting a vacuum cleaner to a remote computer of claim 20, further comprised of the steps of:

providing a switch on said vacuum cleaner; and pushing said switch to initiate the connection of said modem to said telephone network to connect said microprocessor to said remote computer.

22. The method of connecting a vacuum cleaner to a remote computer of claim 21, further comprised of the step of pre-programming said microprocessor with a telephone number of said remote computer.

\* \* \* \* \*